United States Patent [19]

Inoue et al.

[11] Patent Number: 4,782,408
[45] Date of Patent: Nov. 1, 1988

[54] CASSETTE SUPPORT APPARATUS FOR CASSETTE TAPE RECORDING AND/OR REPRODUCING APPARATUS ACCOMMODATING CASSETTES OF DIFFERENCE SIZES

[75] Inventors: Kenichi Inoue, Kanagawa; Takahide Ohtani, Tokyo, both of Japan

[73] Assignee: Sony Corporation, Tokyo, Japan

[21] Appl. No.: 942,709

[22] Filed: Dec. 17, 1986

[30] Foreign Application Priority Data

Dec. 18, 1985 [JP] Japan ................................. 60-194863

[51] Int. Cl.$^4$ ............................................. G11B 15/00
[52] U.S. Cl. .................................. 360/96.5; 360/132; 360/94
[58] Field of Search ....................... 360/83, 85, 94, 93, 360/96.5, 133, 137, 92; 242/199, 200, 201

[56] References Cited

U.S. PATENT DOCUMENTS

4,216,509 8/1980 Sato et al. ............................... 360/94
4,664,337 5/1987 Shiratori .............................. 360/94 X Primary Examiner—Robert S. Tupper
Assistant Examiner—Andrew L. Sniezek
Attorney, Agent, or Firm—Lewis H. Eslinger; Jay H. Maioli

[57] ABSTRACT

A cassette tape recording and/or reproducing apparatus capable of selectively loading at least two tape cassettes whose respective spaces between reels differ from each other, has a pair of reel bases moved to be made to coincide with either of the spaces between the reels, a pair of position reference pins used in common to put either of the two tape cassettes in a horizontally and vertically exact position, and a pair of height reference pins moved together with the pair of reel bases to put either of the two tape cassettes in a vertically exact position, so that the bottom face, the front face and the central plane equidistant from a pair of reels of the cassette are exactly put in respective predetermined normal face or plane positions.

3 Claims, 6 Drawing Sheets

FIG. I

CASSETTE SUPPORT APPARATUS FOR CASSETTE TAPE RECORDING AND/OR REPRODUCING APPARATUS ACCOMMODATING CASSETTES OF DIFFERENCE SIZES

BACKGROUND OF THE INVENTION

1. Field of the Invention

This invention relates generally to a cassette tape recording and/or reproducing apparatus, and more particularly to a cassette tape recording and/or reproducing apparatus, such as a cassette tape video recorder or the like, which is capable of selectively loading either of a large-sized tape cassette and a small-sized tape cassette.

2. Description of the Prior Art

In cassette tape recording and/or reproducing apparatus, such as a cassette tape video recorder (hereinafter referred to as a "VTR"), a pair of right and left position reference pins and a pair of right and left height reference pins are provided on a chassis in the apparatus, and the bottom plate of a tape cassette loaded in the apparatus is engaged with these pins so as to put the tape cassette in its horizontally and vertically exact position by the former pins and in its vertically exact position by the latter pins. And generally, the front side part of the bottom plate near the side of an opening for tape-loading is engaged with the position reference pins, and the right and left corners on the rear side of the bottom wall that are the opposite side for the opening are engaged with the respective height reference pins.

In the meantime, the recent VTR is often so constructed as to be able to record on or reproduce from tape cassetes of more than two sizes that are selectively loaded therein, in which the spaces between a pair of right and left reels are different from one another, such as between the large-sized cassette and the small-sized cassette.

In the VTR of this sort, a pair of right and left reel bases are automatically moved so as to make the space between the reel bases coincide with the space between the reels of the loaded cassette, such as the large-sized cassette or the small-sized cassette, and generally, the reel bases are moved together with the reel motors which drive the reel bases.

However, if the height reference pins of the VTR engaging with the corner portions on the rear side of the small-sized cassette are carelessly projected from the chassis, the height reference pins get in the way of the paths of the reel basses and reel motors.

In order to overcome the above problem, provided in the VTR of this sort is only one height reference pin engaged with the small-sized cassette at the center of the rear side of its bottom plate but the height reference pin provided like that makes it difficult to provide a guide for making the center line with respect to the width of the small-sized cassette coincide with that of the cassette holder, the guide being requisite while the small-sized cassette is inserted in a cassette holder of the VTR.

Furthermore, the height reference pin is generally engaged with the corner portion of the bottom plate of the cassette because the corner portion is rigid enough to obtain the exact positioning of the cassette. On the contrary, the center portion on the side of the bottom plate is not rigid enough and apt to be deformed when the height reference pin is engaged therewith, so it is difficult to obtain the exact positioning of the cassette.

OBJECTS AND SUMMARY OF THE INVENTION

Accordingly, it is an object of the present invention to provide a cassette tape recording and/or reproducing apparatus capable of performing recording and/or reproducing of at least two tape cassettes, such as a large-sized tape cassette and a small-sized tape cassette having spaces between a pair of right and left reels that are different from each other, the apparatus having an improved positioning system.

Another object of this invention is to provide a cassette tape recording and/or reproducing apparatus capable of performing recording and/or reproducing of a least two tape cassettes, such as a large-sized tape cassette and a small-sized tape cassette having spaces between a pair of right and left reels that are different from each other, the apparatus being constructed so that its height reference pins for the tape cassette should not interfere with its reel motors.

A further object of this invention to provide a cassette tape recording and/or reproducing apparatus capable of performing recording and/or reproducing of at least two tape cassettes, such as a large-sized tape cassette and a small-sized tape cassette having spaces between a pair of right and left reels that are different from each other, the apparatus being so constituted as to make either of the two cassette selectively loaded therein put in an exact position.

Still a further object of this invention is to provide improved tape cassettes--a large-sized tape cassette and a small-sized tape cassette--which have spaces between a pair of right and left reels that are different from each other, the tape cassettes being selectively loaded in a cassette tape recording and/or reproducing apparatus to put themselves in the exact positions within the apparatus.

In accordance with an aspect of this invention, a cassette tape recording and/or reproducing apparatus capable of selectively loading at least a large-sized tape cassette and a small-sized tape cassette whose spaces between reels differ from each other is so provided as to comprise a cassette holder movable between a cassette inserting position where the cassette is inserted and a cassette loading position situated thereunder and where the cassette is loaded, a pair of right and left reel bases arranged in the cassette loading position and moved as to be make to coincide with either of the spaces between the reels of the large-sized tape cassette and small-sized tape cassette, a pair of right and left position reference pins used in common to put either of the large-sized tape cassette and the small-sized tape cassette in a horizontally and vertically exact position, and a pair of right and left height reference pins moved together with the pair of reel bases.

Also, in accordance with an aspect of this invention, a tape cassette which is the large one of at least a large-sized tape cassette and a small-sized tape cassette whose spaces between a pair of right and left reels differ from each other and each capable of being selectively loaded in a cassette tape recording and/or reproducing apparatus is so provided as to comprise a pair of right and left positioning holes provided in the bottom plate of the cassette and engaged with a pair of right and left position reference pins disposed within the apparatus in order to put tape cassette in its horizontally and vertically, exact position, and a pair of right and left recesses provided in the bottom plate of the tape cassette in order to prevent itself from contact with a pair of height reference pins disposed within the apparatus to put the small-sized tape cassette in it vertically exact position.

DETAILED DESCRIPTION OF PREFERRED EMBODIMENTS

Referring to the drawings in detail, a VTR capable of selectively loading a large-sized tape cassette and a small-sized tape cassette, embodying the present invention will be described.

Figure 1:
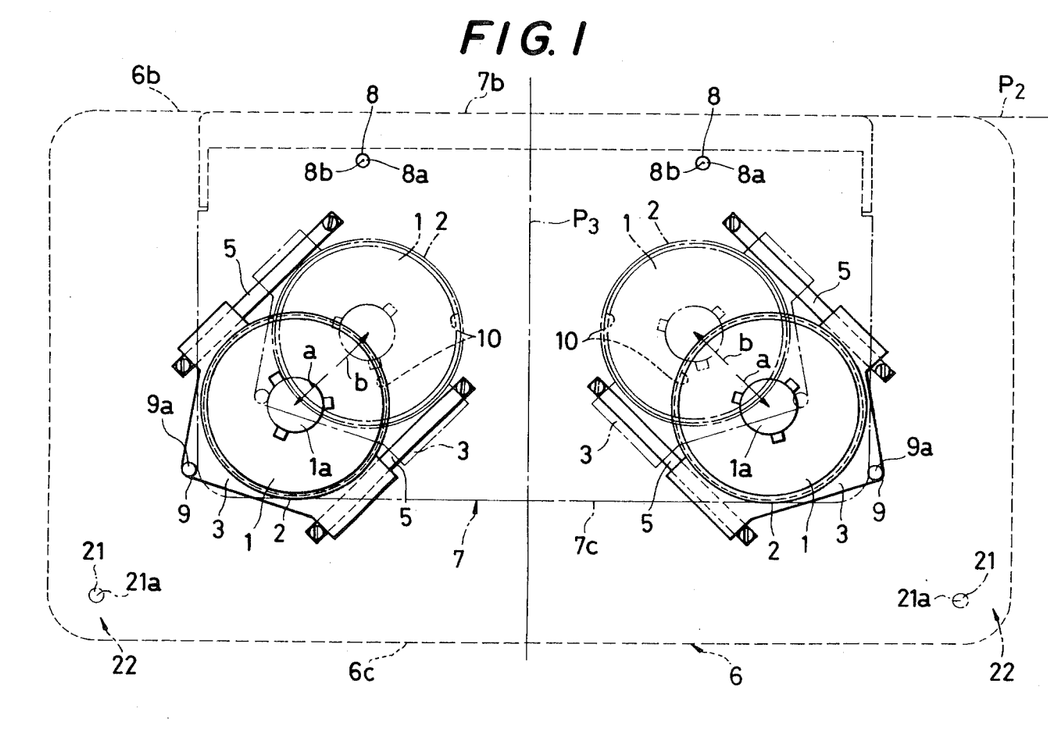
FIG. 1 is a plan view of mobile bases disposed in a cassette tape recording and/or reproducing apparatus according to a first embodiment of this invention.
Figure 2:
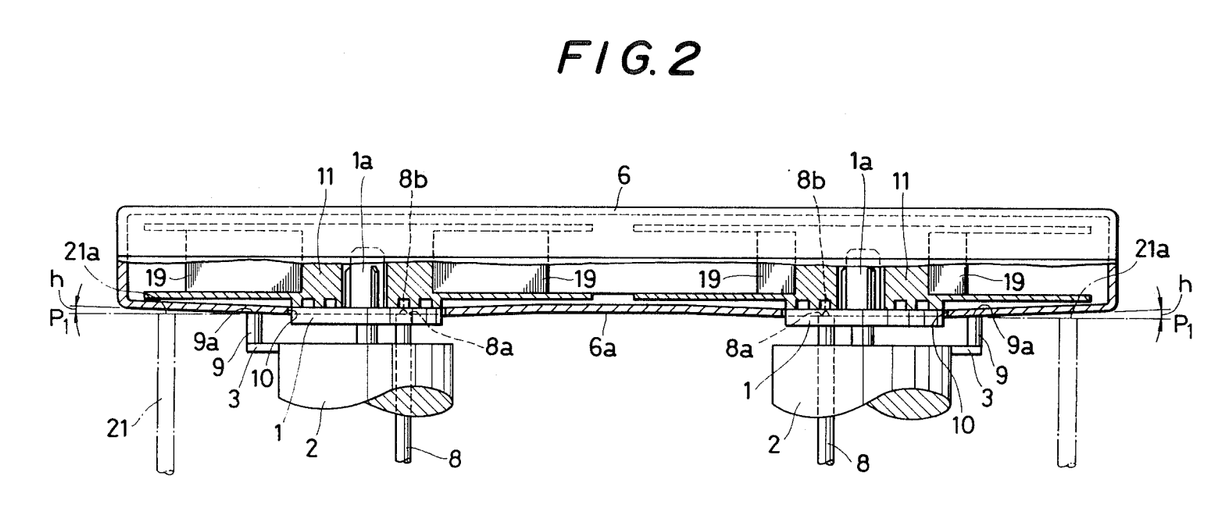
FIG. 2 is an elevation view, partly broken away and in section, of a large-sized tape cassette mounted on the mobile bases of FIG. 1.
Figure 3:
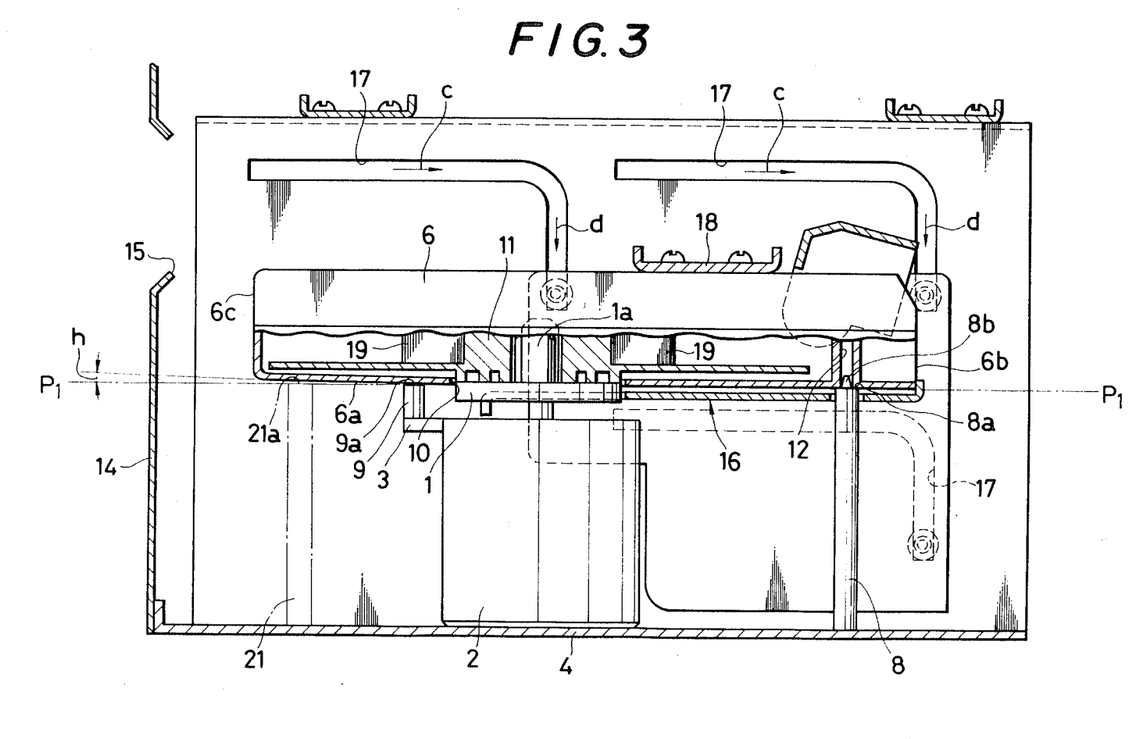
FIG. 3 is a side view, partly broken away and in section, of the large-sized tape cassette loaded in the cassette tape recording and/or reproducing apparatus of FIG. 1.

FIGS. 1 to 3 of the drawings show the first embodiment of this invention. As shown in FIGS. 1 and 2, a pair of right and left mobile bases 3 are movable in direction of arrows a and b each along a pair of guide rails 5 which are horizontally disposed on a chassis 4. A pair of right and left reel bases 1 and a pair of reel motors 2 for driving the reel bases 1 are mounted on the mobile bases 3. Further, a pair of right and left position reference pins 8 and a pair of right and left height reference pins 9 each used in common for positioning the large-sized tape cassette 6 and the small-sized tape cassette 7 are secured to the chassis 4 and the pair of right and left mobile bases 3, respectively.

When the large-sized tape cassette 6 is selectively loaded in the VTR, the reel bases 1 and the height reference pins 9 are moved in advance in the direction of arrow a by the mobile bases 3, and the bottom plate 6a of the large-sized tape cassette 6 is made to come in contact with the upper end faces 8a and 9a of the position reference pins 8 and the height reference pins 9. At the same time, the reel bases 1 are fitted into a pair of right and left reel base insertion holes 10 disposed in the bottom plate 6a, so that the spindles 1a projecting from the reel bases 1 are engaged with a pair of right and left reels 11 in the cassette 6.

Also when the small-sized tape cassette 7 is loaded in the VTR, the reel bases 1 and the height reference pins 9 are moved in advance in the direction of arrow b by the mobile bases 3, and the bottom plate of the small-sized cassette 7 is made to come in contact with the upper end faces 8a and 9a of the position reference pins 8 and the height reference pins 9. At the same time, the spindles 1a of the reel bases 1 are engaged with a pair of right and left reels in the cassette 7.

When the upper end faces 8a of the position reference pins 8 come in contact with the bottom plate of the cassette 6, 7, small-sized positioning pins 8b projected from the center of the upper end faces 8a are engaged with a pair of right and left positioning holes 12 provided in the bottom plate of the cassette 6, 7 near the front face 6b, 7b thereof, so that the front part of the cassette 6, 7 is put in its horizontally and vertically exact position.

Similarly, when the upper end faces 9a of the height reference pins 9 come in contact with the right and left corners of the bottom plate near the rear face 6c, 7c of the cassette 6, 7, the rear part of the cassette 6, 7 is put in its vertically exact position, Thus, without regard for the large-sized tape cassette 6 or the small-sized tape cassette 7, the bottom face, the front face and the plane equidistant from the right and left reels of the cassette 6, 7 are placed in normal bottom face position $P_1'$ normal front face position $P_2'$ and normal equidistance plane position $P_3'$, respectively.

As illustrated in FIG. 3, the cassette 6, 7 is selectively inserted in a cassette holder 16 through a cassette insertion opening 15 disposed in the front panel 14 of the VTR. Thereafter, the to cassette holder 16 is horizontally withdrawn in direction of arrow c and then vertically lowered in direction of arrow d along three L-shaped grooves 17. Thus, the cassette 6, 7 is placed on the upper end bases 8a and 9a and pressed against them from above by a cassette push plate 18 so as to locate the cassette 6, 7 in its exact position.

In the meantime, when the large-sized cassette 6 is much larger than the small-sized cassette 7 as shown in FIG. 1, the height reference pins 9 moved by the mobile bases 3 support the large-sized cassette 6 at the bottom face near the reel base insertion holes 10 as shown in FIGS. 2 and 3.

On the other hand, the reel 11 in the large-sized tape cassette 6 is very large in diameter, around which a long magnet tape is wound, so that the bottom face 6a near the holes 10 of the large-sized tape cassette 6 is apt to be deformed downwards due to the weight of two reels 11 and its low rigidity caused by the existence of the reel base insertion holes 10.

Therefore, the large-sized tape cassette 6 supported by the height reference pins 9 as mentioned above is put in a position higher by height h than the normal bottom face position $P_1'$ as shown in FIGS. 2 and 3, so that the exact positioning of the large-sized cassette 6 becomes difficult. Further, the large-sized cassette 6 supported both at the front side and near the reel base insertion holes 10 of the bottom face 6a by the four reference pins 8 and 9 is apt to be unstable. The larger the cassette 6 is, the more the cassette 6 is unstable, particularly at the side near the rear face 6C of the cassette 6.

To overcome such problems, a pair of right and left height reference pins 21, the space between which is large, are projected from the chassis 4 at the rear sides of the height reference pins 9, so that the position reference pins 8 and height reference pins 21 are disposed on opposite sides to the height reference pins 9 as indicated in chain-dotted lines in FIGS. 1 to 3, whereby the right and left corner portion 22 of the bottom face 6a near the rear face 6c of the large-sized cassette 6 are supported in a more stable manner.

However, as the bottom face 6a of the large-sized cassette 6 is not so accurate in its flatness and the heights of the six reference pins--two position reference pins 8 and four height reference pins 9 and 21--generally differ a little from one another, the large-sized cassette 6 will be unstably supported on these six reference pins 8, 9 and 21.

It would appear that to overcome the above problem the height reference pins 9 would be lowered downwards when the large-sized cassete 6 is loaded, but this must lead to making the construction of the apparatus complex and the manufacture thereof very difficult.

Figure 4:
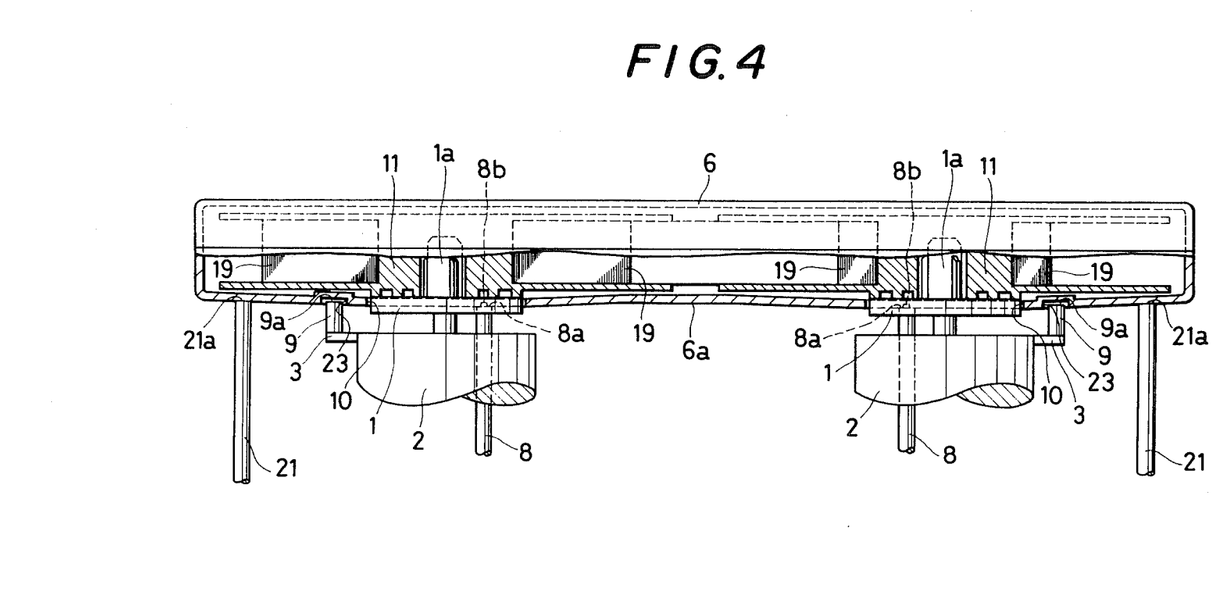
FIG. 4 is an elevation view, partly broken away and in section, of a large-sized tape cassette mounted on mobile bases disposed in a cassette tape recording and/or reproducing apparatus according to a second embodiment of this invention.
Figure 5:
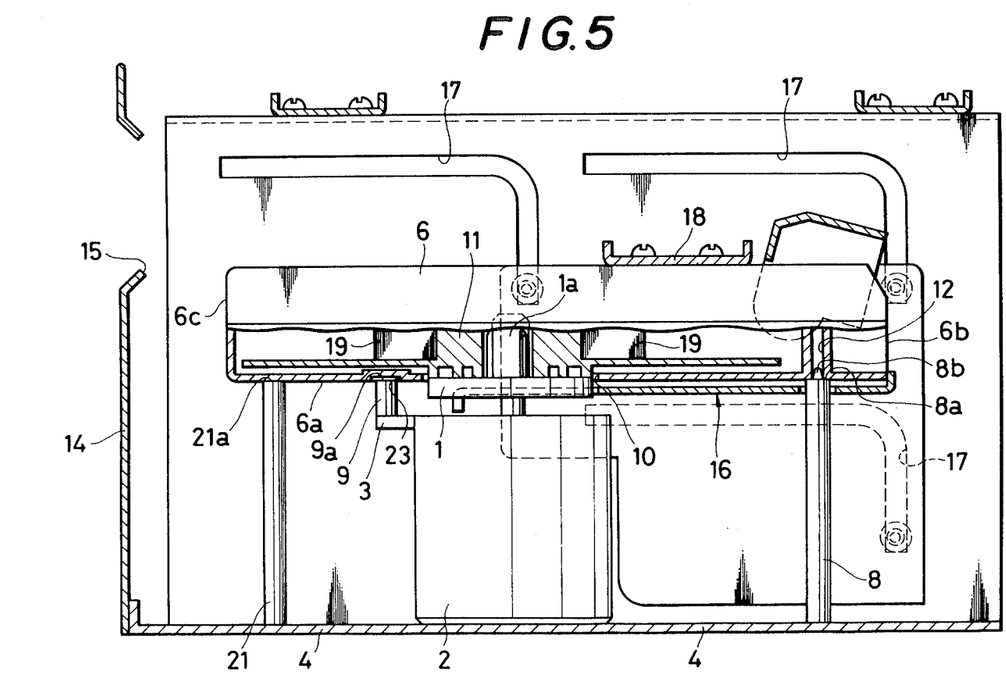
FIG. 5 is a side view, partly broken away and in section, of the large-sized tape cassette loaded in the cassette tape recording and/or reproducing apparatus of FIG. 4.

Now, the second embodiment of this invention will be described with reference to FIGS. 4 to 6 to overcome the problem. In the following description, the same parts of the construction as those shown in FIGS. 1 to 3 are denoted by the same reference numerals and no explanation thereof is deemed necessary.

Figure 6:
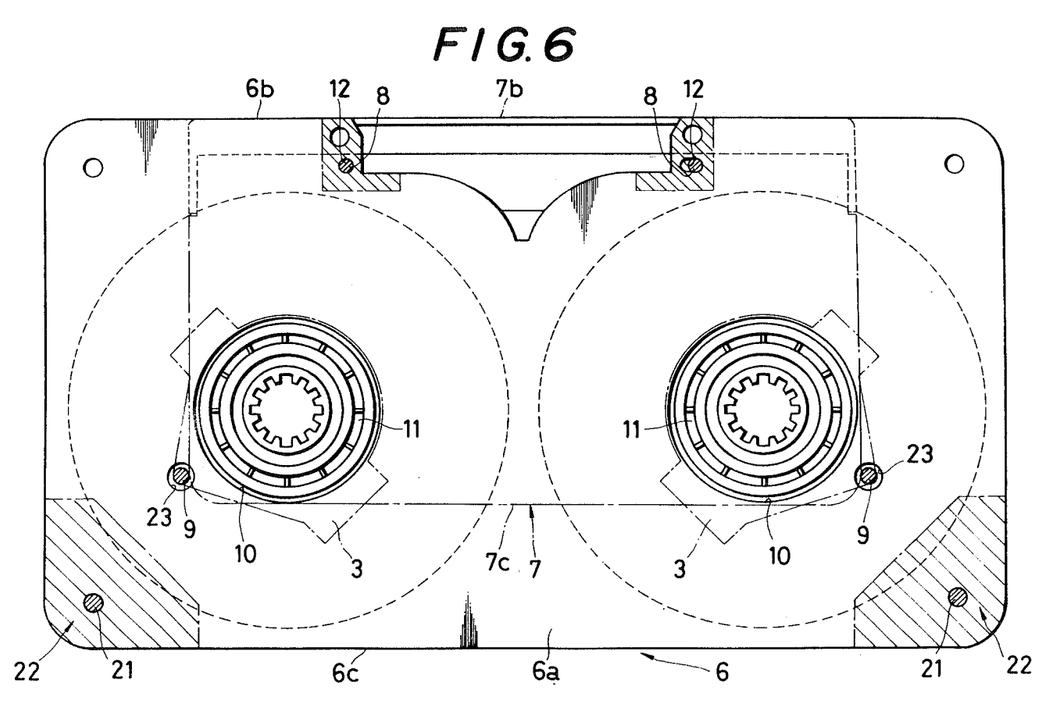
FIG. 6 is a bottom view of the large-sized tape cassette of FIG. 5.

As shown in FIG. 6, the large-sized cassette 6 indicated in solid lines is much larger than the small-sized cassette 7 indicated in chain-dotted lines. The position reference pins 8 used in common for positioning the large-sized cassette 6 and the small-sized cassette 7 are fixed to the chassis 4. The height reference pins 9 for positioning the small-sized cassette 7 are fixed to the mobile base 3, and the height reference pins 21 for positioning the large-sized cassette 6 are fixed to the chassis 4. The former height reference pins 9 may be fixed to the chassis 4 lest they should interfere with the movements of the mobile bases 3.

Provided near the reel base insertion holes 10 in the bottom face 6a of the large-sized cassette 6 are a pair of right and left recesses 23, the inner diameters of which are larger than the outer diameters of the height reference pins 9, and these recesses 23 come just over the height reference pins 9 when the mobile bases 3 are moved in the direction of arrow a in FIG. 1 so as to make them fit for the large-sized cassette 6.

Thus, the bottom base 6a of the large-sized cassette 6 does not come in contact with the height reference pins 9 used for positioning the small-sized cassette 7 owing to the recesses 23, when the bottom bases 6a comes in contact with the upper end faces 8a of the position reference pins 8 near the front face 6b of the cassette 6 and with the upper faces 21a of the height reference pins 21 at the right and left corner portions 22 near the rear face 6c of the cassette 6.

That is, as the large-sized cassette 6 is supported by not six but four reference pins position reference pins 8 and height reference pins 21--and that at the corner portions 22 of the bottom face 6a near the rear face 6c thereof, the stability of the cassette 6 is much improved, and further, the bottom face 6a thereof is exactly put in the normal bottom face position $P_1'$. And the same may be said of the small-sized cassette 7, because the cassette 7 is supported only by the position reference pins 8 and height reference pins 9 in the same manner as mentioned in the first embodiment.

Having described illustrative embodiment of this invention with reference to the accompanying drawings, it is to be understood that the invention is not limited to those precise embodiments, and that various changes and modifications may be effected therein by one skilled in the art without departing from the scope or spirit of the invention as defined in the appended claims.

And this invention can be applied not only to the VTR but also to the various kinds of cassette tape recorder and data processing device.

The apparatus of this invention has the pair of position reference pins 8 used in common for the large-size tape cassette 6 and the small-sized tape cassette 7, and two pairs of height reference pins--the pins 21 used for the large-sized tape cassette 6 and the pins 9 used for the small-sized tape cassette 7. Therefore, whether the cassette 6, 7 is large or small, the front portion of the cassette 6, 7 selectively loaded in the apparatus is put in its accurate horizontal and vertical position by help of the position reference pins 8 which support the right and left portions near the front face 6b, 7b of the cassette 6, 7 and the rear portion of the cassette 6, 7 is put in an accurate vertical position by the help of the respective height reference pins 9, 21 which support the right and left corner portions 22 near the rear face 6c, 7c of the cassette 6, 7, so that the bottom face 6a, the front face 6b, 7b and the central plane equidistant from the pair of reels 11 of the cassette 6, 7 are exactly put in the respective predetermined normal face or plane positions $P_1'$, $P_2$ and $P_3'$. Particularly, in case of the second embodiment, the large-size cassette 6 loaded in the apparatus is made to be out of contact with the height reference pins 9 for positioning the small-sized cassette 7, only with the pair of recesses 23 simply disposed near the reel base insertion holes 10 thereof. In other words, it is unnecessary to adopt such a very complex construction as to lower the pair of height reference pins 9 when the large-size tape cassette 6 is loaded, so as to prevent the large-sized cassette 6 from contact with the pair of height reference pins 9. Further, the large-sized tape cassette 6 is positioned with much accuracy without being influenced by the deformation of the bottom face 6a near the reel base insertion holes 10 thereof, so that the accuracy of recording and reproducing of the large-sized cassette 6 is much improved.

What is claimed is:

1. Apparatus capable of selectively loading into a cassette tape recorder chassis at least a large-sized tape cassette and a small-sized tape cassette each having a pair of reels with respective distances between reels being different each other with said large-sized tape cassette and small-sized tape cassette each having a pair of positioning holes in a respective bottom surface at a front end thereof, the apparatus comprising a cassette holder movable between a cassette inserting position whereat one of said cassettes is horizontally inserted front end first and lowered vertically to a cassette loading position situated thereunder and whereat said selected cassette is respectively loaded, a pair of right and left reel bases movably mounted on said chassis so as to coincide in one position with said distance between the reels of the large-sized tape cassette and in another position with said distance between the reels of said small-sized tape cassette, a pair of right and left position reference pins mounted on the chassis used in common to selectively put each said large-sized and small-sized tape cassette in a predetermined horizontal position with the front of said selected cassette in a predetermined vertical position in said cassette loading position by cooperating with said positioning holes formed in said bottom surface of each said large-sized and small-sized tape cassette, and a pair of right and left height reference pins mounted for movement together with said pair of reel bases respectively for further selectively positioning a rear portion of each said large-sized and small-sized tape cassette in a vertical position which is the same as said predetermined vertical position of said front of said cassette.

2. Apparatus according to claim 1, wherein said pair of reel bases include a corresponding pair of mobile bases for movement with said pair of reel bases and said pair of height reference pins are mounted on said pair of mobile bases respectively, thereby to position said rear portion of said small-sized tape cassette in said predetermined vertical position.

3. Apparatus according to claim 1, wherein the large-sized cassette includes a pair of right and left recesses provided in said bottom surface arranged to prevent contact of said bottom surface of said large-sized cassette with said pair of height reference pins disposed within the tape recorder and mounted on movable tape reel bases thereof and used to put the small-sized tape cassette in its vertically exact position, and; further comprising a second pair of right and left height reference pins mounted on the chassis for further positioning a rear portion of said large-sized tape cassette in a vertical position which is the same as said predetermined vertical position of said front of said large-sized tape cassette.

* * * * *

UNITED STATES PATENT AND TRADEMARK OFFICE
CERTIFICATE OF CORRECTION

PATENT NO. : 4,782,408
DATED : November 1, 1988
INVENTOR(S) : Kenichi Inoue and Takahide Ohtani Page 1 of 2

It is certified that error appears in the above-identified patent and that said Letters Patent is hereby corrected as shown below:

Column 1, line 35, change "cassetes" to --cassettes--.
Column 2, line 17, change "a" to --at--.
Column 3, line 57, after "pins 9" insert -- , respectively--.
Column 4, line 16, change "," to --.--;
         line 21, change "$P_1'$" to --$P_1,$--;
         same line, change "$P_2'$" to --$P_2$--;
         line 22, change "$P_3'$" to --$P_3$--;
         line 26, delete "to";
         line 49, change "$P_1'$" to --$P_1$--.
Column 5, line 54, change "$P_1'$" to --$P_1$--.
Column 6, line 2, change "large-size" to --large-sized--;
         line 19, change "$P_1'$" to --$P_1$--;
         line 20, change "$P_3'$" to --$P_3$--;
         line 21, change "large-size" to --large-sized--;
         line 28, change "large-size" to --large-sized--;

UNITED STATES PATENT AND TRADEMARK OFFICE
CERTIFICATE OF CORRECTION

PATENT NO. : 4,782,408
DATED : November 1, 1988
INVENTOR(S) : Kenichi Inoue et al It is certified that error appears in the above-identified patent and that said Letters Patent is hereby corrected as shown below:

Column 6, line 41, after "different" insert --from--.

Signed and Sealed this

Twenty-fifth Day of April, 1989

Attest:

DONALD J. QUIGG

*Attesting Officer*    *Commissioner of Patents and Trademarks*